Sept. 27, 1966  V. J. CUSHING  3,274,831
ELECTROMAGNETIC FLOWMETER
Filed April 14, 1965  6 Sheets-Sheet 2

INVENTOR
*Vincent J. Cushing*
BY *Shoemaker and Mattare*
ATTORNEYS

Sept. 27, 1966  V. J. CUSHING  3,274,831
ELECTROMAGNETIC FLOWMETER
Filed April 14, 1965  6 Sheets-Sheet 5

INVENTOR
VINCENT J. CUSHING

BY *Shoemaker and Mattare*

ATTORNEYS

INVENTOR
VINCENT J. CUSHING ing fluids, but in addition, the present invention is also
United States Patent Office 3,274,831
Patented Sept. 27, 1966

3,274,831
ELECTROMAGNETIC FLOWMETER
Vincent J. Cushing, 9804 Hillridge Drive,
Kensington, Md.
Filed Apr. 14, 1965, Ser. No. 449,930
33 Claims. (Cl. 73—194)

The present application is a continuation-in-part of copending U.S. patent application Serial No. 181,274, filed March 21, 1962, now abandoned.

Certain features of the invention described herein were made in the performance of work under a NASA contract and are subject to the provisions of the National Aeronautics and Space Act of 1958, Public Law 85–568 (72 Stat. 426; 42 U.S.C. 2451), as amended.

The present invention relates to new and novel magnetic flowmeter apparatus and more particularly to magnetic flowmeter apparatus which is especially adapted for use with dielectric fluids as well as electrically conducting fluids.

Flowmeters of the electro-magnetic induction type have been used for some time with electrically conducting fluids, but these types of flowmeters have not been successfully utilized with fluids of very low electrical conductivity. Such fluids include cryogenic propellants such as liquid oxygen and liquid hydrogen, as well as petroleum products of almost all types and a great variety of chemicals in their fluid state and in non-ionizing solutions.

Flowmeters are utilized with these types of fluids in many different applications such as for example the production, refining, transporttaion and utilization of petroleum products, in the petro-chemicals industry, in the production of plastic resins, in the commercial oxygen industry and in the industries which use cryogenic fluids for various commercial purposes.

Prior art flowmeters utilized for the measurement of flow of dielectric fluids have utilized various arrangements which have proved unsatisfactory for a number of reasons. The flowmeters utilized with such non-conducting fluids have generally employed turbine wheels, probes, and similar arrangements which obstruct the free flow of fluid through the flowmeter and which further produce undesirable pressure drops in the fluid line.

A further form of flowmeter utilized with these types of fluids is the so-called venturi flowmeter, but this type of construction has proved to be so non-linear in response that it is useless in many applications.

In addition to the aforementioned disadvantages of the prior art arrangements, it is apparent that it would be desirable to eliminate the moving parts employed with these types of devices, since the provision of moving parts invariably results in undesirable effects of one kind or another. Additionally, prior art constructions utilized with non-conducting fluids suffer from an inability to provide sensitive response to flow oscillations.

The magnetic flowmeter apparatus of the present invention may, of course, be utilized with electrically conducting fluids, but in addition, the present invention is also particularly designed for use with non-conducting fluids or fluids of very low electrical conductivity.

The arrangement of the present invention employs no moving parts and further provides a completely unobstructed flow passage through the device, since there is no probe or any other means which protrudes into the fluid or disturbs the fluid flow in any way. There is virtually no pressure drop created by the device in the measured fluid, and non-homogeneous fluids such as slurries may be utilized with the apparatus. In addition, a substantially linear response is obtained. Furthermore, the construction of the present invention provides an extremely sensitive response to flow oscillations due to the lack of any moving parts in the apparatus.

The construction of the present invention is further of a very compact and simple nature, which permits the device to be constructed of a variety of materials to suit an almost limitless variety of physical and chemical conditions such as temperature, pressure, corrosion and vibration to which the device may be subjected during use.

In the electromagnetic induction flowmeters as employed in the prior art, a flow induced EMF produces conduction currents of a magnitude which are adequate to actuate sensitive electronic voltage detectors.

In the present invention which is adapted to measure the rate of flow of dielectric fluids, a magnetic field is set up and the flow induced electric field produces polarization currents in the fluid adequate to actuate a suitably sensitive electronic voltage detector.

Since polarization currents produced in the present invention are proportional to the frequency of the flow induced EMF and accordingly proportional to the frequency of the magnetic induction field, it is desirable to use an alternating magnetic induction field of a suitable frequency. The apparatus will operate at any induction frequency, but the fact that a considerable amount of electrical noise is generated whenever a dielectric fluid flows through a pipe must be taken into consideration. Since signal-to-noise ratio is important in any electrical instrument, a practicable flowmeter cannot be feasibly operated where the so-called triboelectric fluid noise is very high. The intensity of the fluid noise varies as $1/f$, where $f$ is the frequency of the noise. Accordingly, the noise level is very high in the neighborhood of 60 cycles a second, and accordingly, the flowmeter can be made operable with a 60 cycle per second induction frequency provided that a quite long response time to changes in fluid flow rate on the order of 5 seconds or more are satisfactory. When the magnetic induction field is operated at a frequency of approximately 1 kilocycle, the fluid noise level will be lower and the flowmeter can be operated with a much more rapid response time on the order of $\frac{1}{10}$ to $\frac{1}{50}$ of a second or thereabouts. In certain industrial applications, a response time of 5 seconds or more way be entirely adequate, whereas in rocket engine applications where response times on the order of 1 to 5 milliseconds are required, it is necessary to operate the flowmeter with an alternating magnetic induction field of a frequency on the order of 10 kilocycles per second. It is accordingly apparent that the frequency of operation of the magnetic induction field may be chosen in accordance with the particular application and required results.

In addition, the magnetic field should be substantially uniform within the pipe through which fluid flows. Accordingly, a magnet configuration having a simple symmetry is employed, this magnet being of a relatively conventional construction which reduces the size of the magnet windings to a minimum.

In the arrangement shown, a coil is wound about the pipe with the wires in the coil running parallel to the pipe, the winding being a series winding. It should be noted, however, that the form of the magnetic means is not critical and that various other types of magnet means can be employed as long as they provide a substantially uniform magnetic field within the pipe.

In order to further minimize the size of the apparatus, a body of magnetic material such as powdered iron is disposed in surrounding relationship to the magnet coil winding, this magnetic material providing a closing path for the induction lines.

The flux densities can be made quite high in the region filled with this magnetic material, thereby permitting this region to be of a relatively small dimension. A surrounding metallic casing because of its skin effect establishes the boundary condition such that there is substantially no magnetic flux which extends outwardly of the casing.

The tubular means through which the fluid flows is formed of a suitable dielectric material, and detecting means is associated with the tubular means, this detecting means taking the form of detecting electrode means for sensing the aforementioned polarization currents produced in the fluid flowing through the pipe. The detecting electrode means may be either on the inside or the outside of the tubular means, but is preferably disposed on the outside thereof so as to eliminate any interference with fluid flowing therethrough.

Since the present invention is particularly designed for use with dielectric fluids and fluids of very low electrical conductivity, the flowmeter, considered as an electrical generator, provides very small signal power. Therefore, it is important to provide detecting electrode means of relatively wide area in order to provide the maximum signal power output of the associated electrical network. Since the tubular means utilized in the present invention is usually circular in cross section as is customary in piping systems, the detecting electrode means may be curvilinear in configuration so as to fit snugly about the outer surface of the tubular means. The detecting electrode means in general will be of a configuration such that it is complementary to the tubular means with which it is associated regardless of the particular cross sectional configuration of the tubular means.

While it is important to provide a detecting electrode means of a substantial area, the electrode means should also be of such a configuration so as to eliminate eddy current losses and to minimize any disturbances to the alternating magnetic field. In order to accomplish these desired results, the detecting electrode means may be of a particular construction. The detecting electrode means may be so constructed that it includes a plurality of electrically conductive portions, the major parts of which are insulated from one another, and wherein means is provided for electrically connecting the electrically conductive portions only at certain points. This construction may take the form of a grid-like arrangement or a laminated arrangement and other similar constructions which meet the above requirements. Alternatively, the detecting electrode means may take the form of a thin sheet-like member such as a sheet of metallic foil or the like, this simpler construction enabling the electrode means to be more readily manufactured and further permitting the electrode means to be located in any particular desired location.

An important and critical feature of the present invention is the provision of shield means which is provided in spaced insulated relationship outwardly of the detecting electrodes. This shield means is in particular disposed directly outwardly of the associated detecting electrode means. The detecting electrode means comprises two separate detecting electrodes electrically insulated from one another and disposed substantially symmetrically on opposite sides of a plane disposed substantially parallel with the magnetic field and substantially passing through the center of the tubular means. The shield means is disposed outwardly of the detecting electrode means with respect to such plane along lines disposed substantially perpendicular to such plane and passing through the detecting electrode means.

This shield means is provided in order to minimize current losses from the detecting electrodes to ground which is important in order to obtain accurate results with the apparatus. In other words, the shield means minimizes the capacitive loading on the detecting electrodes.

Means is also provided for applying an electrical potential to the shield means, this potential being at least as great as the potential on the detecting electrode. With this arrangement, there is virtually no electrical field strength on the exterior surface of the detecting electrodes, and the detecting electrodes are thereby shielded from external noises and ground potential and have a minimum of capacitive loading. In certain instances, the shield means may be driven at a potential which is slightly greater than that on the associated detecting electrodes.

The shield means may also be constructed in a manner similar to that of the detecting electrodes so as to comprise either a gridwork, a laminated construction or a thin sheet-like construction to eliminate eddy current losses and to minimize interference to the alternating magnetic field.

A further important consideration as concerns the shield means is the fact that the shield means is also of a substantial area and at least of the same area as the associated detecting electrode means, and preferably greater in area thereof so as to extend peripherally beyond the associated detecting electrode means as well as longitudinally therebeyond so as to effectively shield the detecting electrode means.

A ground means is also disposed in spaced insulated relationship to the shield means and outwardly thereof, this ground means serving to shield the entire structure inwardly thereof from outside electrical interference, and a plurality of ground means may be employed if such is found to be necessary. This ground means may also be of a construction so as to substantially eliminate eddy current losses and minimize interference to the alternating magnetic field in a manner similar to that discussed previously in connection with the detecting electrodes and shield means.

In a first modification of the present invention, a plurality of detecting electrodes are provided, a shield means being associated with each of said detecting electrodes. This shield means is associated with an exterior electrical network, and a suitable feedback means is provided from the electrical network to the shield means so as to drive the shield means at a suitable potential. The shield means may be overdriven so that it is at a potential slightly greater than that of the detecting electrodes, and the associated amplifying means of the electrical network is gain stabilized with proper negative feedback.

The driven shield means is extended through the transmission line from the detecting electrodes to the input of the associated electrical network by providing a tubular shield means about the transmission line between the flowmeter construction and the electrical network.

A ground means is disposed about the shield means and extends nearly completely around the apparatus disposed inwardly thereof, whereas the detecting electrodes and shield means each extend only through arcs of less than 180 degrees.

The electrical network employed in the first modification of the present invention amplifies the signal from the detecting electrodes and feeds the amplified signal into a phase-sensitive detector which serves to eliminate the hum signal which is generally associated with this type of apparatus and which further is generally in quadrature with the desired signal. The amplifying means itself includes a feedback for balancing out the hum to a great extent.

An additional feedback network is employed for providing the desired signal on the shield means, this feedback network being connected with the output of the amplifying means.

A magnetic sensing means in the form of a magnetic sensing loop is disposed within the alternating magnetic field for sensing the magnetic field. This sensing means is associated with and controls a feedback means for balancing out the hum. Additionally, the magnetic sensing means controls the phase-sensitive detector to ensure proper operation thereof.

For proper operation of the apparatus as discussed hereinabove, the velocity profile of the flowing fluid should be substantially axially symmetrical. To obviate the problem of asymmetric flow, means may be employed for producing a uniform but rotating magnetic field. Along with this rotating magnetic field, more than two detecting electrodes may be employed, such as 3 or 4 or even more electrodes if desired. If three detecting electrodes are provided, a three-phase amplifying means will be employed, and if four detector electrodes are employed, a two-phase amplifying means may be employed.

The advantage of utilizing a rotating magnetic field is that the magnetic field makes one complete revolution in a very short period of time since the magnetic field rotates at the frequnecy of alternation of the magnetic field. Therefore, for relatively high frequencies, the time for one complete revolution of the magnetic field is so short that the flow velocity profile may be considered frozen during the short time interval. In this manner, the rotating magnetic field effectively averages out all flow velocity asymmetries and it is no longer required to have a substantially axially symmetrical profile in the flowmeter.

A modified form of the invention is provided wherein the detecting electrodes include a compensation electrode discussed hereinafter and an opposed detecting electrode disposed adjacent the outer surface of the tubular member and which may have a substantially rectangular plan configuration when in a flattened state. In this modification, a guard ring means is provided for obviating the problem of so-called end-shorting by surrounding this detecting electrode with the guard ring means. In other words, the guard ring means is provided with a central opening which is of substantially rectangular configuration such that it may be disposed about the detecting electrode and spaced substantially uniformly from the outer edges thereof. This guard ring means is connected with a shield means disposed in surrounding relationship to the detecting electrode means and guard ring means.

The sheild means is in turn connected through a feedback path with the amplifier means of the associated electrical circuit which is similar to that employed in connection with the first-mentioned modification of the invention.

The shield means and the guard ring means are driven at unit gain from the output of the amplifier means, and since the guard ring means is so driven, all deleterious effects due to fringing, such as the end-shorting mentioned above, are no longer associated with the detecting electrode means, but rather become a completely unimportant effect on the very low output impedance amplifier means.

Since the driven shield electrode is driven at unit gain from the amplifier means, there is no potential difference between the detecting electrode means, the guard ring means and the shield means. Hence, the effect of fringe capacity and ground capacity is eliminated, and accordingly changes in these capacities due to temperature and dielectric constant changes in the environment are also eliminated.

A lead is provided from the detecting electrode means to the amplifier means of this modification, this lead means being shielded. The lead out from the driven shield means may also be shielded by a suitable ground means, and in the present invention a triaxial transmission line may be employed for this purpose with the outermost portion of the line being connected to ground and serving as a ground means. This ground means is also connected with a ground electrode means which completely surrounds and is spaced from the shield means within the transducer, the ground means being disposed inwardly of the magnet winding which is substantially identical with that previously discussed.

In the previously discussed modification, the driven shield means may be operated at a potential which is slightly greater than that sensed by the detecting electrode means. Such overdriving of the driven shield means is tantamount to providing regenerative feedback from the amplifier means of the electrical circuit back into the detecting electrode or the detecting circuit itself. This may also be accomplisred by providing a positive feedback path from the output of the amplifier through a feedback impedance to the input of the amplifier means. If the proper amount of regenerative feedback is employed, the flowmeter can be made to provide a flow signal which is independent of the electrical properties of the fluid.

By employing a regenerative feedback path in the amplifier means; a suitable impedance means such as a capacitor of good quality and which is temperature stabilized may be employed. This represents a considerable improvement over the arrangement wherein the equivalent capacitance is divided between the shield means and the detecting electrode means since in the latter case the capacitor means may often be subjected to severe temperature environments, the dielectric material in such a case being the temperature sensitive fiberglass or other similar material employed within the transducer means itself.

The output from the amplifier means is connected with a phase-sensitive detector which in turn is connected with a hum compensation network connected with a hum compensation amplifier. The output of this hum compensation amplifier is in turn connected through the intermediary of a shielded lead with the aforementioned compensation electrode which is disposed within the transducer adjacent the outer surface of the tubular member through which the liquid flows, this compensation electrode being disposed in substantially opposed relationship to the detecting electrode means and being spaced from said guard ring means.

In a further modification of the electrical network of the invention, an additional hum compensation network is provided which may be interconnected with the hum compensation network discussed above. This additional hum compensation network is also connected with a driven shield buffer amplifier the output of which is connected with the driven shield. This buffer amplifier is also connected with the output of the aforementioned amplifier means, and this additional means of hum compensation remains effective even if the dielectric properties of the tubular means should change because of severe temperature variations or the like. This additional means of hum compensation is accordingly particularly valuable where the tubular means through which the fluid flows is subjected to severe thermal shock.

An object of the present invention is to provide new and novel magnetic flowmeter apparatus which is adapted to be effectively utilized with both electrically conductive fluids and non-conducting fluids or fluids of very low electrical conductivity.

Another object of the invention is the provision of magnetic flowmeter apparatus employing no moving parts and which provides an unobstructed flow passage for the metered fluid.

A still further object of the invention is to provide magnetic flowmeter apparatus which produces virtually no pressure drop of the measured fluid, which has a linear response, and further which is extremely sensitive to flow oscillations.

A still further object of the invention is the provisions of magnetic flowmeter apparatus which is quite simple and inexpensive in construction, which has a small volume and which is lightweight, and further which can be made of a variety of materials to suit particular operating conditions.

Still another object of the invention is to provide magnetic flowmeter apparatus including means for providing a flow signal which is independent of the electrical properties of the fluid flowing through the apparatus.

Other objects and many attendant advantages of the invention will become more apparent when considered in connection with the specification and accompanying drawings, wherein.

Figure 1:
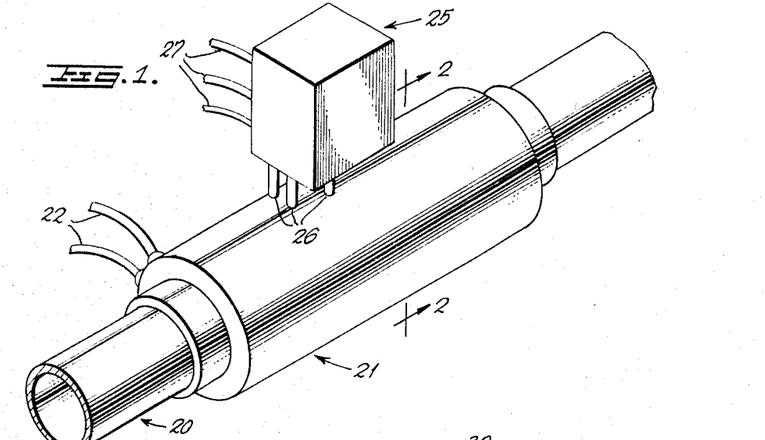
FIG. 1 is a perspective view of a fluid line having incorporated therein the magnetic flowmeter apparatus of the present invention.

Referring now to the drawings wherein like reference characters designate corresponding parts throughout the several views, FIGS. 1–12 inclusive illustrate a first form of the invention, and as seen in FIG. 1, a fluid line is indicated generally by reference numeral 20, through which a fluid is adapted to flow, the transducer portion of the magnetic flowmeter apparatus being indicated generally by reference numeral 21, it being apparent that this portion of the invention is connected in the fluid line such that all of the fluid will flow therethrough.

A pair of leads 22 extend outwardly of the transducer portion and are connected with a suitable generator such as a power oscillator which is adapted to energize the magnet coil windings hereinafter described at a suitable frequency.

Some of the electrical components of the electrical network of the system are disposed within a suitable housing 25, which is supported from the transducer portion by a plurality of supporting legs 26, a plurality of leads 27 extending outwardly from the network and being connected with a suitable source of power and remaining portions of the associated electrical network.

Figure 2:
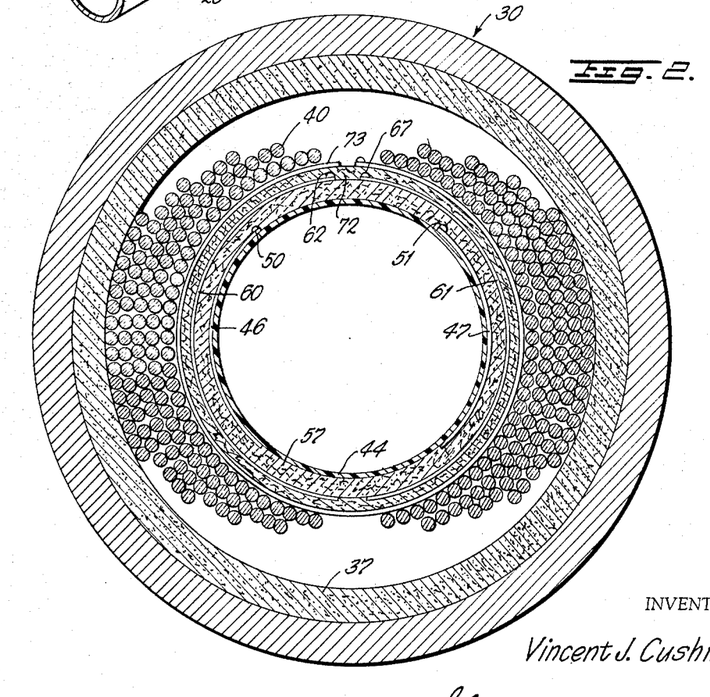
FIG. 2 is a cross-sectional view taken substantially along line 2—2 of FIG. 1 looking in the direction of the arrows.
Figure 3:
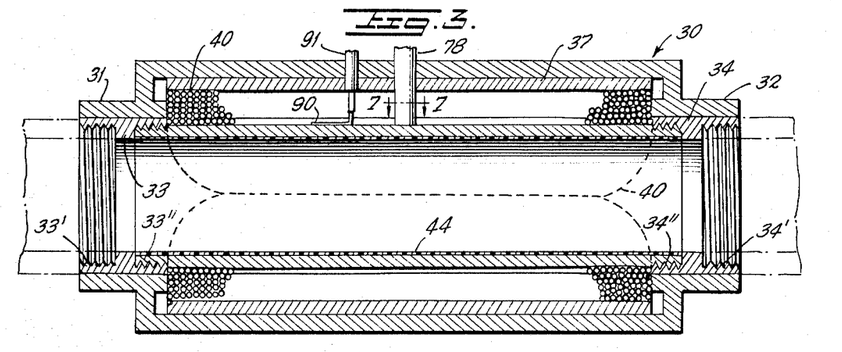
FIG. 3 is a longitudinal section taken through the apparatus shown in FIG. 1 of the drawings.

Referring now to FIGS. 2 and 3, an outermost casing 30 is substantially cylindrical in configuration and is hollow throughout, a pair of annular flanges 31 and 32 extending from opposite ends thereof to facilitate connection with the fluid line. In order to make such connection, a pair of fittings 33 and 34 are positioned within flanges 31 and 32 respectively, these fittings having a first pair of screw threads 33' and 34' (adapted to receive a suitable threaded end portion of the fluid line, second threaded portions 33" and 34" being provided for supporting the intermediate structure as hereinafter described.

Casing 30 is formed of a suitable conductive and/or magnetic substance such as aluminum, and immediately inwardly of the aluminum casing there is provided a cylindrical body 37 formed of magnetic material. In a typical example, the cylindrical body 37 may be formed of powdered iron which as a high degree of permeability which is well known.

Disposed inwardly of the body 37 is the magnet coil winding 40, this coil winding as seen most clearly in FIG. 2 consisting of a plurality of individual wires which extend parallel with the pipe, the wires being turned and extending transversely of the longitudinal axis of the apparatus at opposite ends of the coil winding as will be more readily apparent in FIG. 3.

An inspection of the cross-sectional shape of the winding as seen in FIG. 2 reveals that it is of varying thickness, the coil having its maximum thickness along a horizontal line extending through the center of the apparatus as seen in FIG. 2, and the winding having a minimum thickness along a vertical line extending through the apparatus as seen in FIG. 2. In fact, it will be noted that the magnet winding tapers from a maximum thickness to a point where the magnet winding is actually of zero thickness along the vertical line discussed in connection with FIG. 2.

This particular configuration of the magnet coil winding is of a relatively conventional construction and is commonly called a cosine magnet configuration. This type of configuration provides a substantially uniform magnetic field within the central pipe of the apparatus, and provides an economical and compact construction.

The innermost pipe through which the metered fluid flows in the present invention is indicated by reference numeral 44 and may be formed of a suitable dielectric material such as Teflon or the like. This inner pipe member is preferably of the thinnest possible construction, and a thickness of 0.010 to 0.030 inch is considered to be a practical thickness for this member.

A plurality of detecting electrodes are provided outwardly of pipe 44 and are preferably supported on the outer surface thereof. The detecting electrodes are shown as two in number, and are indicated by reference numerals 46 and 47. These detecting electrodes are, of course, formed of an electrically conductive material and are preferably disposed substantially diametrically opposite to one another. In general, the detecting electrodes of the present invention include at least two separate electrodes which are electrically insulated from one another and which are disposed substantially symmetrically on opposite sides of a plane disposed substantially parallel with the magnetic field and substantially passing through the center of the tubular means or pipe through which the fluid flows.

Detecting electrodes 46 and 47 have been described and illustrated as being supported on the outer surface of pipe 44. It should be understood that in certain instances wherein the material of the electrodes is physically and chemically compatible with the fluid flowing through the apparatus, the detecting electrodes may be supported on the inner surface of the flow pipe in direct contact with the fluid.

Figure 8:
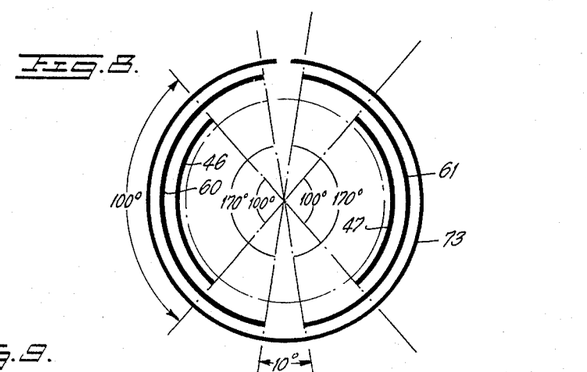
FIG. 8 is a schematic illustration of the relationship of the detecting electrodes, the shield means and the ground means of the apparatus shown in FIGS. 1–6.

As seen in FIG. 8, each of the detecting electrodes extends through an arc of substantialy 100°. It will be understood that the arcuate extent of the detecting electrodes may be varied in accordance with different operating conditions, but in any event, the detecting electrodes should extend through a substantial arc so as to provide the desired relative large area. It is, of course, apparent that the detecting electrodes are of curvilinear configuration as clearly seen in FIG. 2. It should be noted that while the tubular means in the present invention has been illustrated as being of circular cross section, it may also be of other than circular cross sectional configuration, the detecting electrodes in general being of a complementary configuration so as to form a compact structure.

Figures 4, 5, 7:
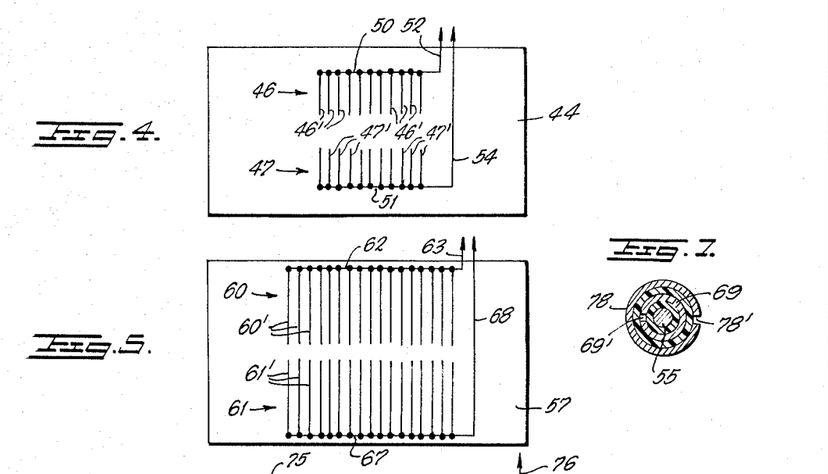
FIG. 4 is a somewhat schematic flattened view of the exterior surface of the pipe through which the fluid flows illustrating the arrangement of the detecting electrodes.
FIG. 5 is a somewhat schematic flattened out view of a portion of the insulating body surrounding the pipe showing the arrangement of the shield means.
FIG. 7 is a cross-sectional view taken substantially along line 7—7 of FIG. 3 looking in the direction of the arrows.

Referring to FIG. 4, a somewhat schematic illustration of pipe 44 in a flattened position is provided. As seen in this figure, detecting electrode 46 comprises a plurality of electrically conductive portions 46', which are of elongated configuration and are spaced a substantial distance from one another so as to be electrically insulated from one another. These electrically insulated portions are in turn connected with one another only at the upper ends thereof as seen in this figure by a common connector means 50, this common connector or bus bar means 50 being seen also in FIG. 2.

In a similar manner, detecting electrode 47 as seen in FIG. 4 is composed of a plurality of elongated electrically conductive portions 47' which are spaced from one another and which in turn are connected only at the lower ends thereof as seen in this figure by means of a common conductor 51. This common conductor or bus bar means 51 can also be seen in FIG. 2.

It will be seen that with this type of construction, the detecting electrodes cover a relatively wide area of the device, and yet at the same time, the construction is such that the alternating magnetic field will not set up appreciable eddy currents which would cause a deleterious change in the magnitude as well as the direction of the desired uniform magnetic induction.

Figure 12:
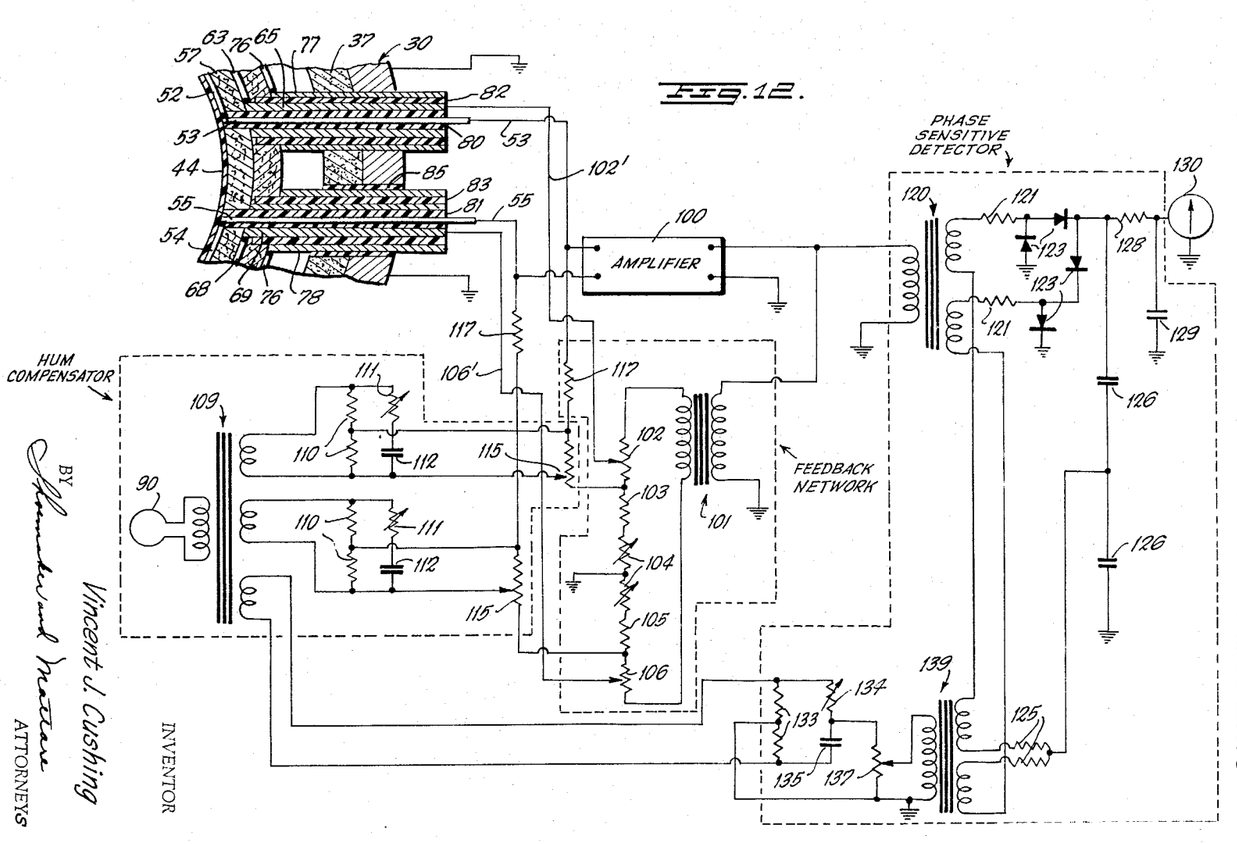
FIG. 12 is a schematic wiring diagram of the electrical network employed in the present invention shown associated with the lead-out means from the transducer portion of the apparatus.

A first lead 52 is illustrated somewhat schematically in FIG. 4, as being connected to bus bar means 50, this lead as seen in FIG. 12 extending around the outer periphery of pipe 44 and providing a connection with a lead 53 which extends outwardly of the casing as hereinafter more fully described.

A lead 54 is indicated schematically in FIG. 4 as connected to bus bar means 51, this lead as seen in FIG. 12 extending around the outer periphery of the pipe 44 and being connected with a lead 55 which extends outwardly of the casing as hereinafter more fully described.

The construction as shown in FIG. 4 may be manufactured in a number of different manners. For example, the cylindrical pipe member 44 may be mounted on a mandrel and then provided with a plurality of circumferentially extending grooves within which conducting wires may be disposed. These conducting wires may then be milled off in a longitudinal direction to provide the desired circumferential dimension of the conducting wires. These wires will then represent the conductive portions 46' and 47' as shown in FIG. 4.

The bus bar means 50 and 51 may comprise a pair of wires suitably connected with the conductive portions and lying within longitudinally extending grooves.

Leads 52 and 54 may, of course, comprise conventional wires connected with bus bar means 50 and 51 respectively.

Alternatively, the construction as shown in FIG. 4 may be provided by first providing a relatively thin layer of electrically conductive material such as foil about the tube or forming an electrically conductive layer of vapor-deposition. The conductive portions and the bus bar means may then be formed by utilizing printed circuit techniques, by etching or by engraving. The spacing of the conductive portions will depend on the desired operating characteristics, the spacing in any event being such that it does not cause excessive disturbances or attenuation of the magnetic field.

Referring again to FIG. 2, a body of suitable insulating material 57 is provided, this body being fiberglass or similar material which has the necessary dielectric and magnetic properties even at cryogenic temperatures. The material should have a large Young's modulus and the thermal coefficient of expansion in the neighborhood of the operating temperatures should be low.

A pair of shield means 60 and 61 are provided, these shield means each being formed of electrically conductive material and being substantially curvilinear in configuration as seen in FIG. 2. It will be noted that, as seen in FIG. 8, the shield means 60 and 61 are disposed outwardly of and adjacent to detecting electrodes 46 and 47 and that the shield means extend through a greater arc than the adjacent detecting electrodes. In this typical example, each of the shield means extends through an arc of 170° as opposed to the arc of 100° through which the detecting electrodes extend. The shield means is disposed directly radially outwardly of the associated detecting electrodes, and is disposed outwardly of the electrodes with respect to the aforesaid plane which is disposed substantially parallel with the magnetic field and substantially passes through the center of the tubular means, the shield means being disposed outwardly of the detecting electrodes with respect to said plane and along lines extending perpendicular from the plane and passing through the detecting electrodes.

Referring to FIG. 5, the body 57 is shown somewhat schematically in a flattened position, and it will be noted that shield means 60 includes a plurality of electrical conductive portions 60' which are spaced from and electrically insulated from one another, and which are joined at the upper portions thereof by a common conductor or bus bar means 62.

A lead indicated schematically by reference numeral 63 is connected with bus bar means 62, and as seen in FIG. 12, lead 63 extends around to a point where it is connected with a tubular conductor 65, hereinafter more fully described.

Shield means 61 comprises a plurality of electrically conductive portions 61' which are spaced from and electrically insulated from one another and which are connected to one another at the lower portions thereof as seen in FIG. 5 by means of a common conductor or bus bar means 67. A lead is indicated schematically at 68, this lead being connected to bus bar means 67 and as seen in FIG. 12, this lead 68 extends around body 57 and is connected with a tubular conductor 69 which will be hereinafter more fully described.

It will be noted that the construction of the shield means as seen in FIG. 5 is similar to the construction of the detecting electrodes as shown in FIG. 4, and it will be understood, of course, that the shield means may be manufactured in the same manner as the detecting electrodes as previously described.

It will also be noted that not only does the shield means extend through a greater circumferential arc or peripheral dimension than does the detecting electrodes, but in addition, the shield means extends longitudinally beyond opposite ends of the detecting electrodes such that the detecting electrodes are effectively encompassed by and protected by the shield means so that the detecting electrodes are effectively isolated from outside electrical interference.

Figure 6:
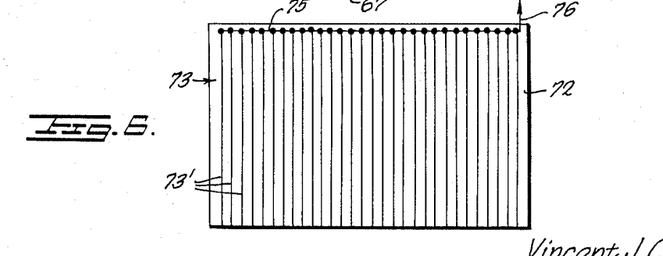
FIG. 6 is a somewhat schematic flattened out view of the body of insulating material surrounding the pipe illustrating the arrangement of the ground means.

Referring again to FIG. 2, a body 72 of insulating material such as fiberglass is disposed in surrounding relationship to the shield means, and a ground means 73 is mounted on the outer surface of body 72. As seen in FIG. 6, ground means 73 includes a plurality of electrically conductive portions 73' which are spaced from and insulated from one another, the upper ends of these conductive portions being connected by a common conductor or bus bar means 75.

A lead 76 is connected with bus bar means 75, lead 76 being connected with tubular conductors 77 and 78 hereinafter more fully described. It will, of course, be understood that ground means 73 may be manufactured in the same manner as the detecting electrodes previously described.

It should also be noted that the bodies of insulating material 57 and 72 may either be separate or part of an integral and homogeneous structure, the bodies in any event serving to provide the proper spacing and electrical insulation between the detecting electrodes, the shield means and the ground means.

As seen in FIG. 8, the ground means 73 extends through an arc of nearly 360°, the opposite ends of the ground means being spaced from one another by a small gap so as not to form a complete loop which might result in eddy current losses.

While the detecting electrodes, shield means and ground means have been each shown as constructed as a grid-like means, it will be understood that various other constructions, such as a laminated arrangement, may be employed, as long as an arrangement is provided which incorporates insulated portions the major parts of which are insulated from one another and which portions are connected to one another at certain points. It is further noted that the detecting electrodes, shield means and ground means may as well be formed of sufficiently thin conductive sheets of material such as foil and the like whereby the same desired end results may be obtained.

Referring to FIG. 12, it will be seen that leads 53 and 55 extend outwardly of the casing and are surrounded by tubular insulating sleeves 80 and 81 respectively. These insulating sleeves are in turn surrounded by the tubular conductors 65 and 69 previously described. These tubular conductors are then in turn surrounded by insulating sleeves 82 and 83 respectively which are further surrounded by tubular conductors 77 and 78 respectively.

This arrangement may be considered a triaxial conductor arrangement, wherein the conductors 53 and 55 from the detecting electrodes are shielded by the tubular shield members 65 and 69, preferably to a point as close to the electrical network as is feasible.

The tubular members 77 and 78 serve as ground shields for the arrangement to a point as close as possible to the electrical network to minimize the effects of any outside electrical disturbances. It will be noted that tubular member 78 is insulated by a tubular insulating member 85 from the casing 30, while tubular member 77 is connected with the casing 30 which in turn is connected with ground.

As seen in FIG. 7, tubular member 69 is preferably provided with a longitudinal extending slot 69' so as to prevent this tubular member from providing a closed loop, thereby minimizing eddy current losses. Tubular member 78 is provided with a longitudinally extending slot 78' for a similar purpose. It will be noted that these slots 69' and 78' are disposed 180° apart so as to provide the maximum shielding benefit. It will be understood that tubular members 65 and 77 are provided with longitudinally extending slots in the same manner as are tubular members 69 and 78 respectively.

As seen in FIG. 3, a magnetic sensing means in the form of a loop 90 of electrically conductive material such as copper is provided, this magnetic sensing loop being disposed outwardly of body 72 and adjacent to the inner portion of the magnet winding so as to sense variations in the magnetic field. Loop 90 extends outwardly of the casing and is surrounded by a tubular insulating member 91.

It will also be noted that the outermost body of insulating material is provided with screw threads at opposite ends thereof which are received in threaded portions 33" and 34" of fittings 33 and 34, thereby permitting the apparatus to be readily assembled and disassembled.

Referring now to FIG. 12, an amplifier 100 is provided, and it will be noted that leads 53 and 55 connected to the detecting electrodes are connected with the input of the amplifier. The amplifier may be a 4-stage negative feedback amplifier of the type having a first-stage input, the amplifier converting the input to a single-sided signal and accordingly, the amplifier is depicted as having a single-sided output.

The first amplifier stage is preferably placed as close as possible to the transducer portion of the apparatus, and will be placed within the housing 25 previously described so as to make the leads as short as possible. The additional three amplifier stages as well as the detection, display and control equipment may be placed at a distance from the transducer portion as is convenient. All wiring between the two locations, of course, should be well shielded.

Various forms of amplifying means may be employed in the present invention, and the above-described amplifier is a typical example. The magnetic means may, of course, be operated at frequencies other than 10 kilocycles per second, and the bandpass characteristics of the amplifier may be varied to pass a suitable band of frequencies on either side of the alternating frequency of the magnetic field.

The output of the amplifier is connected with the primary of a transformer 101, connected in a feedback network indicated by the dotted line so labeled. The secondary of this transformer is connected in series with a potentiometer 102, a resistor 103, ganged rheostats 104, a resistor 105, and a potentiometer 106. Transformer 101 is required since the output of the amplifier is single-sided, whereas the input is push-pull or differential in character, and the transformer 101 serves to convert the single-sided output signal into a push-pull signal for use in the feedback network.

A hum compensator indicated by the dotted line so labeled includes the magnetic sensing loop 90 previously described, this hum compensator being utilized to generate a voltage of equal magnitude but opposite phase to the so-called "transformer effect" hum generated in the sensing circuit. This hum is proportional to the magnitude and frequency of the magnetic field and is independent of flow rate.

The voltage generated by the hum compensator is injected into the input of the amplifier so as to cancel the unwanted hum signal.

The voltage generated in magnetic sensing loop 90 is directly proportional to the magnitude and frequency of by means of the phase-shifting networks connected with the primary of transformer 109 which serves to isolate electrically the magnetic sensing loop from the remainder of the circuitry.

The voltage generated by the magnetic sensing loop must be adjusted to the proper amplitude and phase before being injected into the input of the amplifier. The phase shifting is accomplished in a conventional manner by means of the phase-shifting networks connected with the two upper windings of the secondary of transformer 109 as seen in FIG. 12 and consisting of fixed resistors 110, variable resistors 111, and fixed capacitors 112. The magnitude of the signal to be injected into the input of the amplifier is controlled by means of potentiometers 115.

In order to maintain amplitude stability of the amplifier, a considerable amount of feedback is required. Resistors 103 and 105 determine the amount of feedback in the amplifier, thereby effecting the net gain of the amplifier and the ganged rheostats 104 enable the electrical balancing of the differential amplifier with respect to ground. Resistors 117 are grid-leak resistors from the first stage of the differential amplifier, and resistors 117 must be maintained at a large value in order to provide a high input impedance amplifier.

The voltage applied to the shield means may be adjusted by means of potentiometers 102 and 106, these potentiometers being connected by means of leads 102' and 106' with tubular connectors 65 and 69 respectively which are in turn connected with the shield means. This arrangement enables the shield means to be driven at a voltage which may be slightly in excess of the signal voltage thereby minimizing the input capacitance, or alternatively the shield means may be driven at precisely the same voltage as the signal voltage.

The phase-sensitive detector indicated by the dotted line so labeled is connected with the secondary of a transformer 120, the primary of this transformer being connected with the output of amplifier 100. The phase-sensitive detector includes a pair of resistors 121 interconnected with a plurality of diodes 123, this connection being of a conventional nature so as to be sensitive only to the flow induced voltage. Since the undesirable "transformer effect" hum is electrically in quadrature with the flow induced voltage, the hum will not be detected in the phase-sensitive detector.

Resistors 125 similarly apply the reference phase voltage to the plurality of diodes 123 through the coupling capacitors 126. Resistor 128 and capacitor 129 determine the time constant of the phase-sensitive detector, and provide an output voltage to actuate some sort of indicating means, such as a volt meter indicated by reference numeral 130.

The lowest winding of the secondary of transformer 109 ideally has a voltage which is in quadrature with the alternating magnetic field. For proper performance of the phase-sensitive detector, it is necessary to have a voltage which is in phase with the alternating magnetic field. Accordingly, the lowest winding of the secondary of the transformer 109 is connected with a phase shift network including fixed resistors 133, variable resistor or rheostat 134 and a fixed capacitor 135. The output of this phase shift network is connected with a potentiometer 137 which is connected with the primary of a transformer 139, the secondary of which is connected with the aforedescribed phase-sensitive detector circuitry.

It will be noted that the magnetic sensing means accordingly serves to control the feedback of the shield means and also serves to control the operation of the phase-sensitive detector in accordance with variations of the alternating magnetic field.

Figure 9:
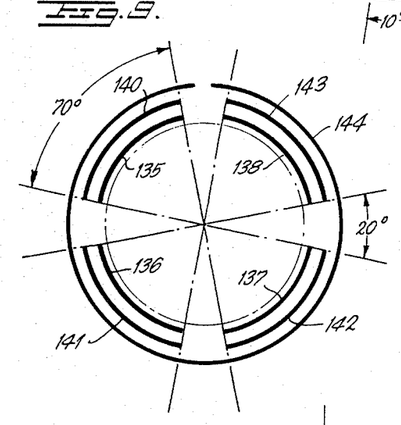
FIG. 9 is a schematic illustration of the arrangement of the detecting electrodes, the shield means and the ground means of a two-phase system.
Figure 10:
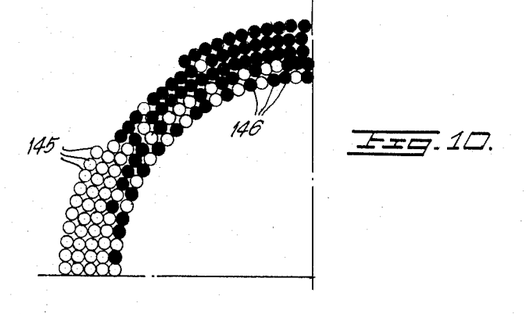
FIG. 10 illustrates the construction of the magnet coil employed in a two-phase flowmeter.

Referring now to FIGS. 9 and 10, a two-phase type arrangement is schematically illustrated. This basically consists of two induction flowmeters according to the present invention, and oriented geometrically at right angles to each other. Each flowmeter supplies its adequately uniform magnetic field and the two magnetic fields are actuated with a 90° electrical phase differential so as to provide a uniform but rotating magnetic field. This field may rotate either clockwise or counter clockwise depending on the relative phasing of the two actuating coils.

In this modification as seen in FIG. 9, four detecting electrodes 135, 136, 137 and 138 are employed, along with four associated shield means 140, 141, 142 and 143. With this particular detecting electrode arrangement, a two-phase amplifier will be employed for detecting the two-phase signal as contrasted to the one-phase amplifier employed with the previously described modification. It will be noted that the detecting electrodes and the shield means may extend through arcs of approximately 70° while a ground means 144 extends substantially completely around the shield means and detecting electrodes as in the first described modification.

FIG. 10 is a cross section through a 90° portion of one of the magnet coils as constructed for use with a two-phase flowmeter. It will be seen that two sets of coils are provided, the first set of coils indicated by reference numeral 145 being represented by circles and the second set of coils being indicated by reference numeral 146 and represented by solid black dots. It is apparent that the two sets of coils are intermeshed and geometrically oriented 90° to one another.

Figure 11:
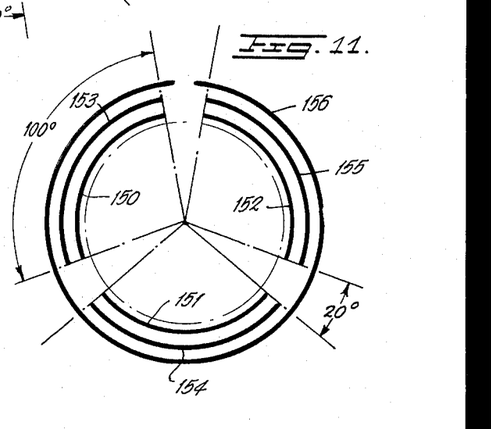
FIG. 11 illustrates schematically the arrangement of the detecting electrodes, the shield means and the ground means of a three-phase flowmeter.

FIG. 11 schematically illustrates a three-phase type flowmeter, wherein three detecting electrodes 150, 151 and 152 are utilized, along with associated shield means 153, 154 and 155. It will be noted that the detecting electrodes and shield means may extend through arcs of substantially 100°, while a ground means 156 extends almost completely around the shield means and detecting electrodes as in the first described modification.

It is apparent that when utilizing a three-phase system, the magnet winding will be so constructed as to provide three magnetic fields with a 120° electrical phase differential, and a three-phase amplifier will be utilized with this type of system.

Figure 13:
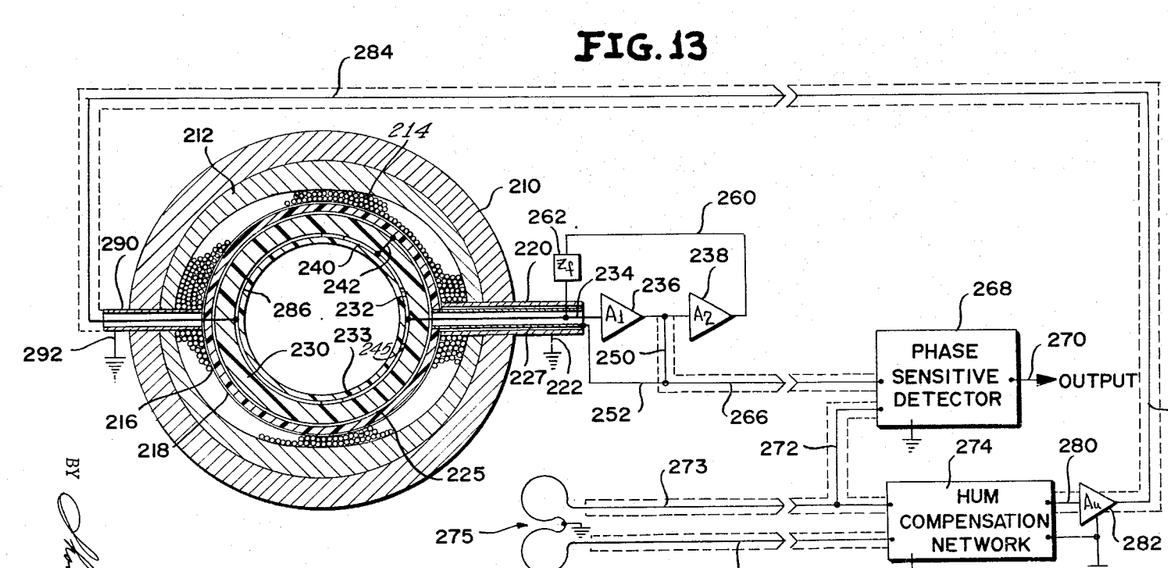
FIG. 13 is a somewhat schematic illustration of a still further modified form of the flowmeter apparatus according to the present invention.
Figure 14:
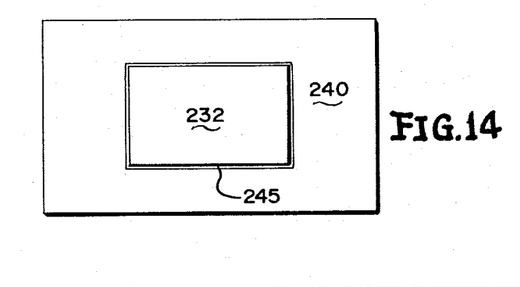
FIG. 14 is a view illustrating the detecting electrode means and its associated guard ring means in its developed or planar form in the modification shown in FIG. 13.

Referring now particularly to FIGS. 13 and 14 of the drawings, a modified form of the invention is illustrated wherein an outer casing or enclosure 210 surrounds a body of magnetic permeable material 212 which in turn is disposed about the magnet winding 214. Members 210, 212 and 214 are similar to the corresponding portions described in connection with the previous modification, and it will be noted that the body of permeable material 212 may in this case be contoured to maintain the inner surface of the body of permeable material 212 closely adjacent to the outer surface of the magnetic winding.

A tubular member 216 formed of suitable dielectric material such as fiberglass, plastic and the like supports a ground means 218 on the outer surface thereof, this ground means defining a substantially cylindrical configuration and preferably being formed either as a gridwork or as a thin metallic foil as discussed hereinbefore. Ground means 218 is connected with a cylindrical conductive portion 220 which forms the outer portion of a triaxial transmission line, portion 220 being connected with ground through a lead 222.

The driven shield means is indicated by reference numeral 225 and is disposed between the inner surface of member 216 and the outer surface of member 230, this driven shield means being preferably formed as a thin sheet of metallic foil. The driven shield 225 is connected with the intermediate cylindrical portion 227 of the triaxial transmission line.

A tubular member 230 formed of suitable dielectric material such as fiberglass or the like is disposed inwardly of the tubular member 216, with the driven shield means 225 interposed between the two tubular members 230 and 216. In this modification the detecting electrode means includes a so-called compensation electrode means described hereinafter and an opposed detecting electrode 232 which is disposed at the inner surface of tubular member 230 and which is interposed between this tubular member and the innermost tubular member 233. Member 233 is formed of suitable dielectric material such as Teflon, Mylar or the like, the liquid being adapted to flow through member 233, it being understood that member 233 may be eliminated if desired.

Detecting electrode 232 is connected to a line 234 which forms the innermost portion of the triaxial transmission line. Line 234 is in turn connected with the input of the first stage 236 of an amplifier means, the output of which is connected with a second stage 238.

Guard ring means 240 is interposed between tubular members 230 and 233, the guard ring means being connected with the driven shield means 225 through the intermediary of a lead 242. Referring now to FIG. 14, the developed or planar form of the detecting electrode 232 and the guard ring means 240 is illustrated. As seen in this figure, it will be noted that the detecting electrode 232 is substantially rectangular in configuration. The guard ring means 240 is also substantially rectangular and includes a central rectangular cutout portion which is slightly greater than the detecting electrode 232 so as to provide a clearance 245 all the way around the outer edges of the detecting electrode. Accordingly, when the two electrodes as seen in FIG. 14 are disposed in operative position as seen in FIG. 6 in curvilinear form, it will be understood that the guard ring means is disposed in spaced relationship with the detecting electrode and provides a substantially uniform spacing completely around the peripheral edge portions of the detecting electrode.

The output of the first stage 236 of the amplifier means is connected through a shielded lead 250 with a lead 252 which in turn is connected with the cylindrical member 227 connected with the shield means 225 which in turn through the intermediary of lead 242 is electrically connected with the guard ring means. The gain of the portion 236 of the amplifier means is unity, and accordingly, the driven shield means 225 as well as the guard ring means 240 is driven at unit gain from the output of portion 236 of the amplifier means. Accordingly, there is no potential difference between the detecting electrode 232 and the adjacent guard ring means and shield means thereby eliminating the effect of the aforementioned fringe capacity and ground capacity.

This modification of the invention also employs regenerative feedback, and it will be noted that the output of portion 238 of the amplifier means is connected by means of a lead 260 through an impedance means 262 with the lead 234 connecting the detecting electrode to the input of the amplifier means. This arrangement provides a regenerative feedback path from the output of the amplifier means to the input thereof through the feedback impedance 262 which may in a typical example take the form of a high quality temperature stabilized capacitor. The proper gain setting of amplifier portion $A_2$ may be established in terms of flowmeter and amplifier circuit parameters which are entirely independent of the electrical properties of the fluid. With the gain setting suitably establishing, the detected voltage is equal to the flow generated voltage regardless of the electrical properties of the fluid. This very desirable operating feature is achieved by regeneratively feeding back into the flow detection circuit through the impedance $Z_f$ the output of the detection amplifier.

The amplifier means is also connected through a lead 266 with a phase-sensitive detector 268 which in turn has the output thereof connected through a lead 270 with a suitable output means. This phase-sensitive detector means may be similar to that described in connection with FIG. 12 of the drawings.

The phase-sensitive detector means is in turn connected through a lead 272 with a lead 273 which in turn is connected with a hum compensation network 274. A lead 276 additionally connects the hum compensation network with a reference loop indicated generally by reference numeral 275 which is suitably disposed in the magnetic field of the transducer. It will be understood that the hum compensation network and the reference loop in the magnetic field operate in a similar manner to that discussed in connection with the circuit shown in FIG. 12 of the drawings.

The output of the hum compensation network is connected through a lead 280 with a hum compensation amplifier 282 the output of which is connected through a lead 284 with detecting electrode or compensation electrode 286 which is interposed between the tubular members 230 and 233. Here again, electrode 286 may be formed either as a gridwork or as a sufficiently thin metallic foil as discussed hereinbefore. A tubular shield portion 290 is illustrated as being in surrounding relationship to the lead 284 extending outwardly from the compensation electrode 286. This shield means is in turn connected through a lead 292 with ground. It will further be noted that the various leads 266, 272, 273, 276, 280 and 284 are each illustrated as being surrounded by a suitable shield means as indicated by the dotted lines such that all of these leads are of a shielded wire configuration. This shield means may consist of sufficiently thin foil such that while the foil will serve as an excellent electrostatic shield, it will give rise to negligible eddy currents and disturbance to the magnetic field. This is especially important in shielding those portions of leads 234 and 284 which extend radially outwardly from the electrodes 232 and 286 respectively.

Figure 15:
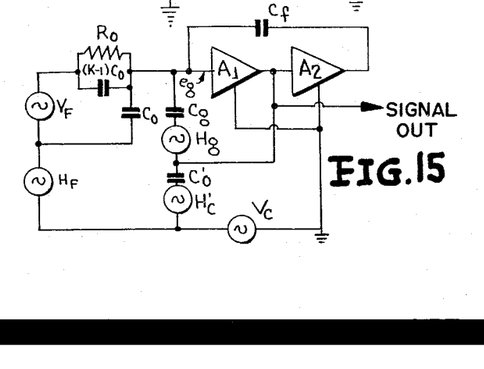
FIG. 15 is a diagrammatic illustration of the equivalent circuit of the modification shown in FIG. 16.

FIGURE 15 is the equivalent circuit for the apparatus shown in FIG. 13. For completeness in the diagram, we include the resistor $R_o$, which depends on the electric conductivity of the fluid, but in the analysis below we will not carry this quantity along—in the interest of simplicity. The capacity of $C_g$ shown in FIG. 15 is that between the detection electrode and the driven-shield electrode. The fringe capacitance $C_o'$ continues to exist physically, of course, only now it is a capacitance between the compensation electrode and the output of the unit gain transducer amplifier, i.e., it is the capacitance between the guard ring means and the compensation electrode.

In FIG. 15, the flow generated voltage $V_F$ can be shown to be $$V_F = \frac{BF}{a} \frac{\sin \beta}{E(\beta, 1)}$$

where B is the magnetic induction; $a$ is the interior radius of the flow conduit; F is the volumetric flowrate; $E(\beta, 1)$ is a tabulated elliptic integral; and $\beta$ is the semi-angle subtended by the detection electrode.

$C_o$ as employed hereinafter and as shown in FIG. 15 is the direct capacitance between detection electrodes 232 and 286 when the flow conduit is empty of fluid.

Every pair of electrodes has, in principle, associated with it a hum generator. In particular, the circuit involving the fringe capacitance $C_o'$ has an associated hum generator $H_C'$. Our first observation is that the output impedance of the unit gain amplifier driving the guard ring means and driven-shield means is very low—of the order of 20 ohms. At the same time, the reactance of the fringe capacitance $C_o'$ is very large—of the order of five to ten megohms; hence, we see that the hum generator $H_C'$ is effectively short circuited and need be considered no further.

With this in mind (and again hereafter neglecting the flowmeter's internal resistance $R_o$ in the interest of simplicity) we find that the flowmeter's fundamental equation for flow signal $e_g$ is given by $$e_g = \frac{(K-1)C_o V_F + KC_o(H_F + V_C) + C_g H_g}{KC_o + C_g(1-A_1) + C_f(1-A_1 A_2)} \quad (1)$$

where $A_1$ is the gain at which the driven-shield means is operated, and which gain evidently should be set at unity if we are to obviate the effect of $C_g$, and where K is the dielectric constant of the metered fluid and where $V_C$ is the voltage developed by the hum compensation network.

$A_1 A_2$ is the over-all gain or the gain which is fed back regeneratively through the feedback capacitor, $C_f$. (For simplicity we assume here that the feedback impedance $Z_f$ shown in FIG. 13 is essentially a capacitor $C_f$.)

Note that there is no hum generator $H_f$ associated with the regenerative feedback capacitor $C_f$, since $C_f$ is not located in the alternating magnetic flux.

Setting the driven-shield means gain $A_1$ at unity we find that the proper gain setting $A_2$ for volumetric flow measurement in the electromagnetic flowmeter is to be established at $$A_{2v} = 1 + C_o/C_f \quad (2)$$

When this is done, flowmeter signal $e_g$ is expressed by $$e_g = V_F + \frac{K(H_F + V_C) + C_g H_g/C_o}{K-1} \quad (3)$$

From Eq. 3 we do indeed obtain a flow signal which is linearly proportional to $V_F$ and hence to the volumetric flowrate, F. Also from Eq. 3 we note that the hum $H_F$ associated with the circuit containing the compensation electrode and the detection electrode becomes multiplied by $K/(K-1)$. Since this multiplying factor becomes indefinitely large when the pipe is empty or when a large vapor bubble fills the flowmeter, it suggests that some automatic means might well be employed to deactivate the flowmeter during such vaporous or vacuous periods.

The ratio $e_g/V_C$ in this modification of the magnetic flowmeter is given by $$e_g/V_C = K/(K-1) \quad (4)$$

and a simple criterion for the proper establishment of the regenerative gain $A_{2v}$ is that the magnet be shut off, the pipe emptied, and $A_2$ be adjusted until $e_g/V_C$ reaches a very large value (ideally just to the point of oscillation). This permits one in the field to have a means of checking the operability of the electromagnetic flowmeter for the volumetric flow measurement.

For mass flow measurement the proper gain setting $A_{2m}$ is to be established at $$A_{2m} = 1 - 2C_o/C_t \qquad (5)$$

The mass flowmeter voltage is $$e_z = DF_m + \frac{K(H_f + V_C) + C_g H_g / C_o}{K+2} \qquad (6)$$

Where $$D = \frac{BM \sin \beta}{aE(\beta, 1)} \qquad (7)$$

and where B is the intensity of magnetic induction, M is the Clausius-Mossotti constant for the metered fluid, $\beta$ is the semi-angle subtended by the detecting electrode, $a$ is the interior radius of the flow circuit, and $E(\beta,1)$ is a tabulated elliptic integral (of the first kind).

The volumetric mode of operation in the electromagnetic flowmeter gives rise to noise when vapor passes through the meter. A mass flowmeter should not be upset by such a vapor bubble, and indeed the mass flowmeter of operation for the electromagnetic flowmeter as seen by Eq. 6 does not give rise to any such difficulty, since the denominator no longer goes to zero under such conditons as it does in Eq. 3.

In the mass flowrate mode of operation the voltage $e_g/V_C$ is given by $$e_g/V_C = K/(K+2) \qquad (8)$$

And again, the easiest available standard dielectric for the tune-up procedure is an empty pipe with a dielectric constant $K=1$; thus in the mass flowmeter mode of operation the gain $A_{2m}$ should be adjusted until we have simply $$e_g/V_C = \frac{1}{3} \qquad (9)$$

This is indeed a very simple in-the-field test to make for the proper mass flowrate operability of the flowmeter.

Figure 16:
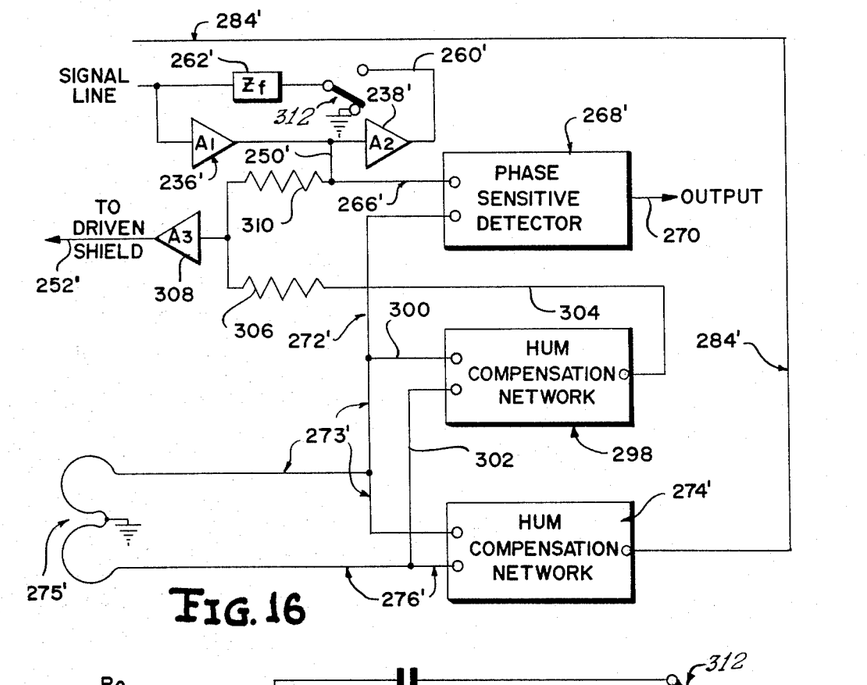
FIG. 16 is a schematic wiring diagram of a modified form of electrical network to be employed in the apparatus shown in FIG. 13.
Figure 17:
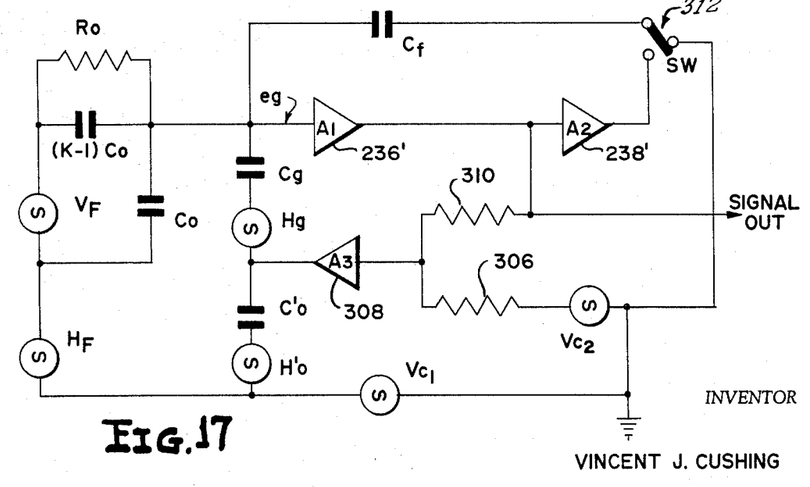
FIG. 17 is a diagrammatic illustration of the equivalent circuit of the modification shown in FIG. 16.

Referring now to FIGS. 16 and 17, a modification is illustrated wherein FIG. 16 represents an altered form of the electrical network shown in FIG. 13, FIG 17 being a view similar to FIG. 15 and comprising a diagrammatic illustration of the equivalent circuit of the modification shown in FIG. 16.

Referring now particularly to FIGS. 16 and 17, a modified form of the electrical circuits shown in FIGS. 13 and 15 is illustrated. The portions of the electrical circuit shown in FIG. 16 which are similar to that discussed in connection with FIG. 15 have been given the same reference numerals primed. It will be noticed that hum compensation network 274' is connected in substantially the same manner as hum compensation network 274, the output signal from this network being fed into the transmission line 284. However, as seen in FIG. 16, an additional hum compensation network is indicated generally by reference numeral 298 and is connected with the first-mentioned hum compensation network by means of leads 300 and 302. The output of network 298 is connected with a lead 304 which in turn is connected through a resistor 306 with the input of a driven shield buffer amplifier 308 the output of which is connected with lead 252' corresponding to lead 252 as seen in FIG. 13.

The output of amplifier portion 236' is connected through the intermediary of lead 250' with a register 310 so that the output of amplifier portion 236' is also fed to the input of the buffer amplifier 308.

The two resistors 306 and 310 form a rudimentary adder circuit, and if the two resistor values are equal, then the input to amplifier 308 is equal to one-half the sum of the output of hum compensation network 298 and the output of the first stage amplifier 236'.

It will be noted that in this modified form of the invention, a hum compensation network is provided having a portion thereof operatively associated with the magnetic field of the apparatus and wherein the output of such hum compensation network is connected with the shield means.

With this arrangement, the hum compensation network automatically assures that the hum voltage is substantially nulled during all phases of operation regardless of changes in the hum voltage caused by changes in the electrical conductivity and the dielectric constant of both the tubular fluid conducting means as well as the metered fluid.

For proper operation, then we require that $$A_1 A_3 = 2 \qquad (10)$$

The virtue of the additional hum compensation means is that the compensation remains effective even if the dielectric properties of the flowpipe should change as for example when subjected to severe temperature changes. This additional hum compensation means is accordingly particularly valuable where the flow conduit is subjected to severe thermal shock.

As seen in FIG. 16, the feedback impedance 262' may be optionally attached to the output of amplifier portion 238' or to circuit ground through the intermediary of a selectively operable switch 312. The attachment is made to the output of amplifier portion 238' if one desires to measure volumetric flowrate, and the requirement is that $$A_2 = A_{2v} \qquad (11)$$

where $A_{2v}$ is as prescribed by Eq. 2, previously discussed. On the other hand, if one desires to measure mass flow, the product $A_1 A_2$ should be set equal to $A_{2m}$ as set forth in Eq. 5 previously discussed.

In many practicable situations, the impedance $Z_f$ may be adjusted such that the prescribed value of $A_{2m}$ is equal to zero. From Eq. 5, this requires that the output of the amplifier 238' be zero, and the most precise way of obtaining this is to set the voltage at zero by connecting impedance 262' to circuit ground as indicated in full lines in FIG. 16.

FIG. 17 illustrates the equivalent circuit which is analogous to that shown in FIG. 16.

It is apparent from the foregoing that there is provided a new and novel magnetic flowmeter apparatus which is adapted for use not only with electrically conducting fluids, but also with dielectric fluids and fluids of very low electrical conductivity. The flowmeter apparatus of the present invention has no moving parts and provides an unobstructed flow passage therethrough. There is virtually no drop in pressure of the measured metered fluid and a linear response is provided. The device is also extremely sensitive to flow oscillations. The overall construction is such that a small volume lightweight device is provided, the arrangement being simple and inexpensive and such that the apparatus can be made of a variety of materials to suit any particular operation condition.

The electrical network of the present invention provides a means for compensating for hum and the feedback to the shield means ensures maximum efficiency and reliability.

The two latter modified forms of the invention each employ regenerative feedback in order to provide a flow signal which is independent of the electrical properties of the fluid. This regenerative feedback can be properly adjusted to obtain the desired results. The modifications shown in FIGS. 13 and 16 are particularly sophisticated forms of the invention employing novel constructions for obtaining optimum results.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly coopera-

I claim:

1. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another, shield means disposed directly outwardly of at least one of said detecting electrodes with respect to the center of the adjacent tubular means, and an electrical network electrically connected with each of said electrodes and with said shield means whereby said electrodes and said shield means are electrically connected with one another.

2. Apparatus as defined in claim 1 including guard ring means disposed adjacent said tubular means and being in closely spaced relationship to one of said detecting electrodes and substantially uniformly spaced about the outer edges of said one detecting electrode.

3. Magnetic flowmeter apparatus comprising a tubular means of dielectric material through which fluid is adapted to flow, means for producing an alternating magnetic field within said tubular means, detecting means adjacent said tubular means and within the said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes with respect to said plane, and an electrical network electrically connected with each of said electrodes and with said shield means whereby said electrodes and said shield means are electrically connected with one another.

4. Apparatus as defined in claim 3 including guard ring means disposed adjacent said tubular means and being in closely spaced relationship to one of said detecting electrodes and substantially uniformly spaced about the outer edges of said one detecting electrode.

5. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes along lines extending substantially perpendicular to said plane and passing through said electrode, said shield means being insulated from said one of said detecting electrodes, and an electrical network electrically connected with each of said electrodes and with said shield means whereby said electrodes and said shield means are electrically connected with one another.

6. Apparatus as defined in claim 5 including guard ring means disposed adjacent said tubular means and being in closely spaced relationship to one of said detecting electrodes and substantially uniformly spaced about the outer edges of said one detecting electrode.

7. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes along lines extending substantially perpendicular to said plane and passing through said electrode, said shield means being insulated from said one of said detecting electrodes, and an electrical network electrically connected with each of said electrodes and with said shield means whereby said electrodes and said shield means are electrically connected with one another, said electrical circuit including means for applying an electrical potential to said shield means at least substantially as great as the potential on said one detecting electrode for reducing current losses from said one detecting electrode to ground.

8. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes with respect to said plane, said shield means having an area at least as great as the area of said one detecting electrode, and an electrical network electrically connected with each of said electrodes and with said shield means whereby said electrodes and said shield means are electrically connected with one another.

9. Apparatus as defined in claim 8 including guard ring means disposed adjacent said tubular means and being in closely spaced relationship to one of said detecting electrodes and substantially uniformly spaced about the outer edges of said one detecting electrode.

10. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes along lines extending substantially perpendicular to said plane and passing through said electrode, said shield means being insulated from said one of said detecting electrodes, and an electrical network electrically connected with each of said electrodes and with said shield means whereby said electrodes and said shield means are electrically connected with one another, said electrical circuit including means for applying an electrical potential to said shield means at least substantially as great as the potential on said one detecting electrode for reducing current losses from said one detecting electrode to ground, said shield means having an area at least as great as one detecting electrode.

11. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes along lines extending substantially perpendicular to said plane and passing through said electrode, said shield means being insulated from said one of said detecting electrodes, and an electrical network electrically connected with each of said electrodes and with said shield means whereby said electrodes and said shield means are electrically connected with one another, said electrical circuit including means for applying an electrical potential to said shield means which is greater than the electrical potential on said one detecting electrode for reducing current losses from said one detecting electrode to ground.

12. Magnetic flowmeter apparatus comprising a tubular means of dielectric material through which fluid is adapted to flow, means for producing an alternating magnetic field within said tubular means, detecting means adjacent said tubular means and within the said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes with respect to said plane, said shield means having an area which is greater than the area of said one detecting electrode, and an electrical network electrically connected with each of said electrodes and with said shield means whereby said electrodes and said shield means are electrically connected with one another.

13. Apparatus as defined in claim 12 including guard ring means disposed adjacent said tubular means and being in closely spaced relationship to one of said detecting electrodes and substantially uniformly spaced about the outer edges of said one detecting electrode.

14. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, shield means disposed outwardly of at least one of said detecting electrodes along lines extending substantially perpendicular to said plane and passing through said electrode, said shield means being insulated from said one of said detecting electrodes, and an electrical network electrically connected with each of said electrodes and with said shield means whereby said electrodes and said shield means are electrically connected with one another, said electrical circuit including means for applying an electrical potential to said shield means which is greater than the electrical potential on said one detecting electrode for reducing current losses from said one detecting electrode to ground, said shield means having an area which is greater than said one detecting electrode.

15. Magnetic flowmeter apparatus comprising a tubular means of dielectric material through which fluid is adapted to flow, means for producing an alternating magnetic field within said tubular means, detecting means adjacent said tubular means and within said magnetic field for detecting electrical signals in the fluid flowing through said tubular means, said detecting means including at least two separate detecting electrodes electrically insulated from one another and covering a substantial area, a plurality of shield means electrically insulated from and disposed outwardly of said detecting electrodes, each of said shield means also covering a substantial area, each of said shield means extending peripherally a greater distance than an adjacent detecting electrode and also extending in a longitudinal direction beyond the opposite ends of an adjacent detecting electrode, and an electrical network electrically connected with each of said electrodes and with said shield means whereby said electrodes and said shield means are electrically connected with one another, said electrical circuit including means for applying an electrical potential to said shield means for reducing current losses from said detecting means to ground.

16. Magnetic flowmeter apparatus comprising a tubular member formed of dielectric material through which fluid is adapted to flow, magnetic means including a magnet winding disposed in surrounding relationship to said tubular member for producing a substantially uniform magnetic field within said tubular member, a plurality of detecting electrodes spaced from and insulated from one another and disposed adjacent said tubular member and outside thereof for detecting electrical signals in the fluid flowing through said tubular member, each of said detecting electrodes being of curvilinear configuration and covering a relatively large area, a plurality of shield means spaced from and electrically insulated from one another, one shield means being disposed adjacent to and spaced directly outwardly from each of said detecting electrodes with respect to the center of the adjacent tubular member, each of said shield means being of curvilinear configuration and extending over a relatively large area, each of said shield means extending through an arc greater than the adjacent detecting electrode and extending longitudinally beyond the opposite ends of the adjacent detecting electrode, an electrical network connected with said detecting electrodes for indicating the flow through said tubular member, said electrical network including means connected with said shield means for applying electrical potential to said driven shield means for reducing current losses from said detecting electrodes to ground.

17. Apparatus as defined in claim 16, including ground means disposed in spaced surrounding relationship to said shield means for protecting said shield means from outside interference.

18. Apparatus as defined in claim 16 including guard ring means disposed adjacent said tubular means and being in closely spaced relationship to one of said detecting electrodes and substantially uniformly spaced about the outer edges of said one detecting electrode.

19. Magnetic flowmeter apparatus comprising a tubular member formed of dielectric material through which fluid is adapted to flow, magnetic means disposed in surrounding relationship to said tubular member for producing a substantially uniform magnetic field within said tubular member, a plurality of spaced detecting electrodes disposed adjacent said tubular member and outwardly thereof, each of said detecting electrodes including a plurality of electrically conductive portions, means electrically insulating the major parts of said portions from one another, means electrically connecting said portions to one another only at certain points, a body of insulating material disposed in surrounding relationship to said detecting electrodes, a plurality of shield means disposed directly outwardly of and in spaced relationship to said detecting electrodes with respect to the center of the adjacent tubular member and being insulated therefrom by said body, each of said shield means including a plurality of electrically conductive portions, the major parts of which are electrically insulated from one another and which further are electrically connected to one another only at certain points, and an electrical network electrically connected with each of said electrodes and with said shield means whereby said electrodes and said shield means are electrically connected with one another, said electrical circuit including means connected with said shield means for applying an electrical potential to the shield means for reducing current losses from said detecting means to ground.

20. Apparatus as defined in claim 19, wherein said shield means is surrounded by a body of dielectric material and said last-mentioned body has a ground means supported on the outer surface thereof, said ground means being provided for protecting the detecting electrodes and the shield means from outside interference.

21. Magnetic flowmeter apparatus comprising a tubular member formed of dielectric material and through which fluid is adapted to flow, a plurality of detecting electrodes disposed on the outer surface of said tubular member and spaced from and insulated from one another, said detecting electrodes each being substantially curvilinear in configuration and including a plurality of electrically conductive portions the major parts of which are electrically insulated from one another and which are further electrically connected to one another only at certain points, a body of insulating material disposed in surrounding relationship to said tubular member and outwardly of said detecting electrodes, a plurality of shield means spaced directly outwardly of said detecting electrodes with respect to the center of the adjacent tubular member and insulated therefrom by said last-mentioned body, each of said shield means being substantially curvilinear in configuration and including a plurality of electrically conductive portions, the major parts of which are electrically insulated from one another and further which are electrically connected to one another only at certain points, a body of dielectric material disposed outwardly of said shield means, a ground means disposed outwardly of said last-mentioned body and in substantially surrounding relationship to the aforementioned structure, a magnet coil winding disposed outwardly of said ground means, a body of permeable material disposed about said magnet winding coil, a casing disposed in surrounding relationship to said body of permeable material, and a plurality of electrical leads extending outwardly of said casing, one of said leads being connected to each of said detecting electrodes and one of said leads being connected to each of said shield means, and an electrical network electrically connected with each of said electrodes and with said shield means whereby said electrodes and said shield means are electrically connected with one another.

22. Apparatus as defined in claim 21, including a magnetic sensing means disposed adjacent said magnet coil winding for sensing the magnetic field generated in the apparatus, and lead means connected with said sensing means and extending outwardly of said casing.

23. Magnetic flowmeter apparatus comprising a tubular means of dielectric material through which fluid is adapted to flow, means for producing an alternating magnetic field within said tubular means, detecting means adjacent said tubular means and within the said magnetic field for detecting electrical signals in the fluid flowing through said tubular means, said detecting means including at least two separate detecting electrodes electrically insulated from one another and disposed substantially symmetrically on opposite sides of a plane disposed substantially parallel with said magnetic field and substantially passing through the center of said tubular means, and shield means disposed outwardly of at least one of said detecting electrodes with respect to said plane, an electrical network including amplifying means having an input and an output, the input of said amplifying means being connected with said one detecting electrode, and positive feedback means connected with the output of said amplifying means and also being connected with said shield means for applying an electrical potential to said shield means which is at least as great as the electrical potential on said one detecting electrode.

24. Apparatus as defined in claim 23 including phase-sensitive detection means, said phase-sensitive detection means being connected with the output of said amplifying means.

25. Apparatus as defined in claim 24 including magnetic sensing means disposed adjacent said means for producing an alternating magnetic field for sensing the magnetic field generated thereby, said magnetic sensing means being connected with said phase-sensitive detection means for controlling the operation of said phase-sensitive detection means.

26. Magnetic flowmeter apparatus comprising a tubular means of dielectric material through which fluid is adapted to flow, means for producing an alternating magnetic field within said tubular means, detecting electrode means comprising a pair of detecting electrodes disposed adjacent said tubular means and extending throughout a substantial area, amplifier means having an input and an output, lead means connecting said detecting electrode means with the input of said amplifier means, means providing a regenerative feedback path through an impedance from the output of said amplifier means to the input thereof, shield means disposed directly outwardly of said detecting electrode means with respect to the center of said tubular means, and means providing a feedback path from said amplifier means to said shield means to apply an electric potential to the shield means at least as great as the electric potential on said detecting electrode means.

27. Apparatus as defined in claim 26 wherein said shield means is driven at unit gain through said feedback path from said amplifier means.

28. Apparatus as defined in claim 26 including guard ring means disposed adjacent said tubular means and being in closely spaced relationship to one of said detecting electrodes and substantially uniformly spaced about the outer edges of said one detecting electrode.

29. Apparatus as defined in claim 27 including guard ring means disposed adjacent said tubular means and being in closely spaced relationship to one of said detecting electrodes and substantially uniformly spaced about the outer edges of said one detecting electrode.

30. Apparatus as defined in claim 26 including means for shielding said lead means from said detecting electrode means to said amplifier means.

31. Apparatus as defined in claim 26 including a guard ring means disposed adjacent said tubular means and in spaced relationship to said detecting electrode means, and means electrically connecting said guard ring means with said shield means such that said guard ring means is operated at substantially the same potential as said shield means.

32. Apparatus as defined in claim 26 including ground means disposed in surrounding relationship to said shield means.

33. Apparatus as defined in claim 1 wherein each of said detecting electrodes is of curvilinear configuration covering a substantial area, said shield means also being of curvilinear configuration and covering a large area, said shield means extending through a greater arc than an adjacent detecting electrode and also extending in a longitudinal direction beyond the opposite ends of an adjacent detecting electrode.

References Cited by the Examiner

UNITED STATES PATENTS

| | | | |
|---|---|---|---|
| 2,149,847 | 3/1939 | Kolin | 73—194 |
| 2,696,737 | 12/1954 | Mittlemann | 73—194 |
| 2,729,103 | 1/1956 | Raynsford et al. | 79—194 |
| 2,733,604 | 2/1956 | Coulter | 73—194 |
| 2,771,771 | 11/1956 | Kamp et al. | 73—194 |
| 2,893,243 | 7/1959 | Hurley | 73—194 |
| 2,896,451 | 7/1959 | Rinia | 73—194 |
| 3,178,941 | 4/1965 | Berry | 73—194 |

RICHARD C. QUEISSER, *Primary Examiner.*

L. R. FRANKLIN, *Assistant Examiner.*